(12) United States Patent
Herrada et al.

(10) Patent No.: US 7,034,477 B2
(45) Date of Patent: Apr. 25, 2006

(54) DOMESTIC ELECTRICAL APPLIANCE INCLUDING AN ELECTRIC MOTOR

(75) Inventors: José Herrada, Vienne (FR); Michel Guinet, Pau (FR)

(73) Assignee: SEB SA, Ecully (FR)

( * ) Notice: Subject to any disclaimer, the term of this patent is extended or adjusted under 35 U.S.C. 154(b) by 0 days.

(21) Appl. No.: 11/070,363

(22) Filed: Mar. 2, 2005

(65) Prior Publication Data

US 2005/0194920 A1 Sep. 8, 2005

(30) Foreign Application Priority Data

Mar. 3, 2004 (FR) .................................. 04 50435

(51) Int. Cl.
*H02P 3/18* (2006.01)

(52) U.S. Cl. ........................ 318/244; 318/245; 310/158
(58) Field of Classification Search ................ 318/245, 318/244; 310/158, 177
See application file for complete search history.

(56) References Cited

U.S. PATENT DOCUMENTS

| | | | | |
|---|---|---|---|---|
| 3,548,276 A * | 12/1970 | Gross | ........................... | 318/245 |
| 3,596,161 A * | 7/1971 | Swanke et al. | .............. | 388/827 |
| 4,199,268 A * | 4/1980 | Parzych | ....................... | 366/306 |
| 4,395,670 A * | 7/1983 | Podell | ......................... | 318/758 |
| 4,725,764 A * | 2/1988 | Prestel | ......................... | 318/258 |
| 5,063,319 A * | 11/1991 | Mason et al. | ................ | 310/210 |
| 5,294,874 A * | 3/1994 | Hessenberger et al. | ..... | 318/759 |
| 5,644,112 A | 7/1997 | Geiger et al. | ............... | 200/1 R |
| 5,757,154 A * | 5/1998 | Peot | ........................... | 318/381 |
| 5,835,676 A * | 11/1998 | Komatsu et al. | ............ | 388/811 |
| 6,016,041 A * | 1/2000 | Weinmann | ................ | 318/245 |
| 6,037,729 A * | 3/2000 | Woods et al. | ............... | 318/375 |
| 6,104,155 A * | 8/2000 | Rosa | ........................... | 318/381 |
| 6,172,437 B1 * | 1/2001 | Du | .............................. | 310/136 |
| 6,525,495 B1 * | 2/2003 | Bianchi | ...................... | 318/381 |

* cited by examiner

*Primary Examiner*—Rita Leykin
(74) *Attorney, Agent, or Firm*—Heslin Rothenberg Farley & Mesiti P.C.

(57) ABSTRACT

Domestic electrical appliance, including a universal electric motor powered by direct current via an electrical circuit linked to a DC electrical voltage source, said circuit including a chopper arrangement, including a capacitor in parallel with the DC voltage source, and one or more solid-state switches, wherein the circuit also includes two controllable switches, for automatically reconfiguring said circuit:

a first switch, connected on the one hand, to a first terminal of a motor winding, and on the other hand, alternately to the DC voltage source and to the first terminal of the motor rotor;

a second switch, connected on the one hand, to the second terminal of said motor winding, and on the other hand, alternately to one or to the other of the terminals of the motor rotor.

6 Claims, 1 Drawing Sheet

DOMESTIC ELECTRICAL APPLIANCE INCLUDING AN ELECTRIC MOTOR

BACKGROUND OF THE INVENTION

The invention relates to the domestic electrical appliance sector and, more particularly, to small domestic electrical appliances, used in food preparation. It is more specifically aimed at an arrangement of the electrical control circuit, designed to provide rapid braking of the motor. It is therefore applicable quite specifically, but not exclusively, to food processors.

DESCRIPTION OF THE PRIOR ART

As a general rule, the standards applicable to food processors including slicing tools demand mechanical stopping of the motor within a relatively short time, of the order of one or two seconds after the user has carried out a maneuver making these tools accessible. The electrical control circuit of the motor is therefore generally arranged to cause the motor to be stopped immediately the bowl or the lid is moved.

Thus, the solution illustrated in FIG. 1, which consists in equipping the electrical circuit with switches ($S_A$, $S_B$), for reversing the relative position of one or other of the windings of the motor relative to the rotor, so converting the motor to a generator, is known. More specifically, when the bowl is opened by moving the lid, the two switches ($S_A$, $S_B$) are automatically switched over, such that the winding $L_1$ is no longer connected with the top terminal of the rotor R but with the bottom terminal. The inductive energy stored in the winding $L_1$ then causes the current in the rotor R to switch to a direction opposite to its direction immediately before the switches were switched over. Since the motor is then operating in generator mode, the currents increase because of the short circuit increasing the braking load. Thus, the mechanical energy of the rotating elements is rapidly converted into electrical energy dissipated in the motor windings. This therefore causes the motor to stop more quickly. This solution is satisfactory when the motor is powered by alternating current from the mains (5).

In practice, the currents circulating in the motor windings are alternating currents, and can easily be cut by conventional switches having an appropriate breaking capacity.

Electric motor control solutions employed in certain appliances requiring a speed control are also known. For this speed control, and as illustrated in FIG. 2, the motor (M) is powered by direct current via an electrical circuit including a chopper arrangement (H), which is in turn powered by a DC voltage source (15). Direct current is understood to mean a current with a mean value that is not zero, and which can be unidirectional, that is, of constant polarity. This DC voltage source can be a rectifier bridge, the output voltage of which is smoothed by the presence of a capacitor connected in parallel with the load, or a battery type constant voltage source.

The solution employed for braking motors powered by alternating current, as illustrated in FIG. 1, cannot be applied to the variants powering the motor by direct current, as illustrated in FIG. 2. In practice, assuming that the AC voltage source (5) of FIG. 1 were replaced by the output of the chopper arrangement (H) of FIG. 2, rapid degradations of the switch contacts, but above all contact sticking effects due to the passage of a direct current, would be observed.

The sticking effects not only degrade, and even destroy, the switches, but they also keep the motor powered and do not therefore allow it to be stopped when required. This defect is obviously prohibitive, for user safety reasons.

The problem that the invention therefore seeks to resolve is how to obtain, for a DC motor power supply circuit, performance characteristics similar to those observed with AC motor power systems. Another objective is to obtain this result with components, and in particular switches, similar to those also used for the alternating current solutions, and this to avoid any significant extra costs.

SUMMARY OF THE INVENTION

The invention therefore relates to a domestic electrical appliance which includes a universal electric motor, powered by direct current. This power supply is provided by an electrical circuit linked to a DC electrical voltage source. This circuit includes a chopper arrangement, including a capacitor connected in parallel with the DC voltage source, and one or more solid-state switches.

According to the invention, this electrical circuit also includes two controllable switches, for automatically reconfiguring the circuit. A first switch is connected on the one hand to a first terminal of a motor winding, and on the other hand, alternately, to the DC voltage source and to the first terminal of the motor rotor. A second switch is connected on the one hand to the second terminal of the same motor winding, and on the other hand, alternately, to one or the other of the terminals of the motor rotor.

In other words, the invention consists in providing the power supply circuit of the motor with different switches, for linking one of the motor windings in the direction opposite to its direction in normal mode. This reconfiguration is possible because the overvoltage that occurs at the terminals of the motor when the current to an inductive load is cut off is limited, through the presence of the smoothing capacitor at the chopper input. In practice, when the motor winding is disconnected from the electrical power source, the smoothing capacitor is discharged through the motor winding, therefore limiting the voltage variation on the switch. It is therefore possible to use conventional switches, having breaking capacities similar to those employed by solutions powering the motor by alternating current.

In practice, it is preferable for the switch switchover control means to provide a staggered switchover of these two switches. Provoking in this way the opening of the second switch, connected to the motor rotor while the first switch linked to the capacitor has already switched over, ensures that the capacitor provides its characteristic compensation effect.

This staggering can be obtained in different ways, and in particular by an electrical arrangement, or even mechanical, staggered in space, of the two levers opening the switches. This staggering is tailored to the architecture of the appliance, and the configuration of the parts providing access to the slicing tools.

However, in the case where it is desirable to guard against simultaneous opening of the two switches, for example by using relay type electrical switches, the presence of an electrical resistor can be provided, linking the second terminal of the motor winding to the first terminal of the motor rotor. This resistor, which is short circuited by the switch in normal operation, is connected in parallel with the winding and the rotor in the event of simultaneous opening. The value of this resistor is chosen to be high enough not to impair the braking effect and low enough to limit the arc on opening the switch.

BRIEF DESCRIPTION OF THE DRAWINGS

How to implement the invention, and the benefits that accrue from it, will become clearly apparent from the description of the embodiment that follows, based on the appended drawings in which.

DESCRIPTION OF THE PREFERRED EMBODIMENTS

As already stated, the invention discloses a solution for ensuring the rapid braking of a food preparation appliance motor, which is compatible with the use of a speed adjustment by chopper type control. This solution makes it possible to employ components similar to those employed on fixed or variable speed solutions having a TRIAC or similar type bidirectional switch, in which the motor is powered by alternating current.

Figure 1:
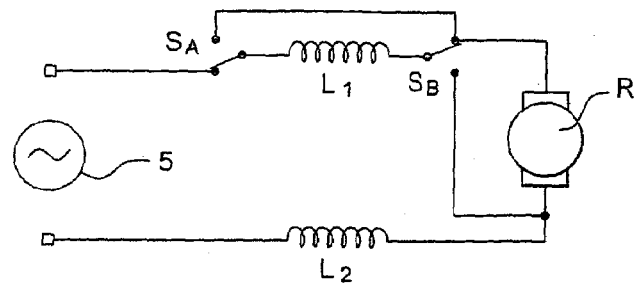
FIGS. 1 and 2 are electrical circuit diagrams illustrating the way in which the motor is powered in the prior art solutions.
Figure 2:
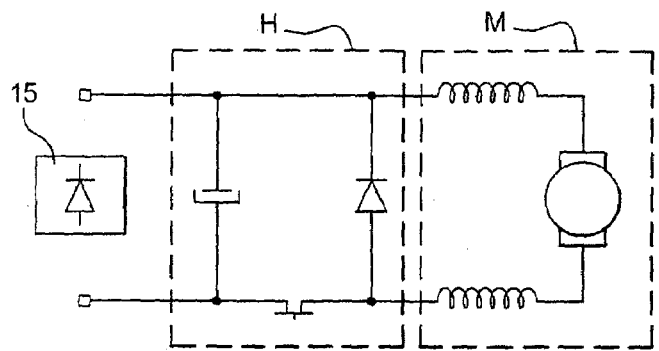
Figure 3:
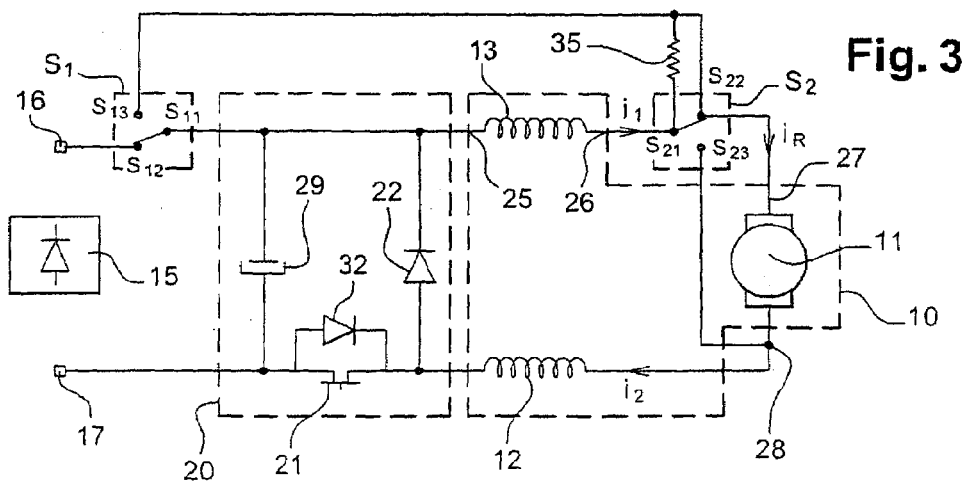
FIG. 3 is a similar electrical circuit diagram, illustrating the solution of the invention.

More specifically, and as illustrated in FIG. 3, the motor (10) includes a rotor (11) and two stator windings (12, 13). This motor (10) is powered, from a DC voltage source (15) which can, for example, be obtained by rectifying the mains AC voltage, or, more generally, from any other voltage source. This DC voltage source (15) may or may not include a smoothing capacitor.

Variation of the motor speed can be obtained using a chopper arrangement (20). This chopper arrangement (20) includes, as illustrated in FIG. 3, a solid-state switch (21), which in the form illustrated is represented as an IGBT, but which, naturally, can be produced in many ways without departing from the context of the invention. The chopper arrangement (20) also includes a freewheeling diode (22) which is passed through by the current circulating in the motor when the solid-state switch (21) is open.

During the periods when the solid-state switch is on, the chopper (20) can therefore be used to apply a voltage corresponding to that present at the smoothing capacitor located at the chopper input.

According to the invention, the electrical circuitry includes two mechanically controlled switches ($S_1$, $S_2$). From an electrical point of view, the first of these switches ($S_1$) has a terminal ($S_{11}$) linked in the manner illustrated to the terminal (25) of the top winding (13) of the motor. The second terminal ($S_{12}$) of the switch ($S_1$) is linked in normal operation to the output (16) of the DC voltage source (15). The third terminal ($S_{13}$) of the switch ($S_1$) is linked to the first terminal ($S_{11}$) in braking control situations.

The second switch ($S_2$) has its first terminal ($S_{21}$) linked to the second terminal (26) of the motor winding. The contact of the second switch ($S_2$) can move between two terminals ($S_{22}$, $S_{23}$), each linked to a terminal (27, 28) of the motor rotor. The terminal ($S_{22}$) of the second switch ($S_2$) is linked to the top terminal (27) of the rotor in normal operation, and linked to the terminal ($S_{13}$) of the first switch ($S_1$), used in braking situations.

Normally, the two switches ($S_1$, $S_2$) are mechanically controlled when braking of the motor is dictated by the safety requirements. Thus, when the bowl of the food processor is opened, the corresponding mechanical movement, which can be the swiveling of the lid, causes the switches to switch over from the rest position, as illustrated in FIG. 3, to the reverse position. Naturally, this mechanical control of the switches can be handled differently, according to the architecture of the processor, and the operation causing the slicing tools to be made accessible. For example, it is possible to use relay type electrical switches, employing one or two contacts.

In the form illustrated, and therefore in normal operation, the same current ($i_1 = i_R = i_2$) circulates in the windings (13, 12) and the rotor (11), according to the chopper control.

Since it is essential to ensure braking of the motor, the first switch ($S_1$) switches over, therefore cutting the power supply from the DC voltage source (15). In this case, the current ($i_1$) circulating in the top winding (13) is maintained by the discharging of the smoothing capacitor (29), therefore limiting the current variation in the winding (13), and therefore the voltage at its terminals, and, consequently, the overvoltage created on the switch. Preferably, the second switch ($S_2$) is switched over with a slight stagger, such that a few milliseconds later, the second terminal (26) of the winding (13) is connected to the bottom terminal (28) of the rotor. In this case, the currents circulating in the winding (13) and in the rotor are reversed ($i_1 = -i_R$) so as to create a load opposing the movement, since the motor is then operating as a generator, so resulting in a braking of the rotating parts.

In the form illustrated in FIG. 3, the circuitry also includes a diode (32) mounted antiparallel to the solid-state switch (21), to avoid the voltage at the terminals of the capacitor (29) becoming too negative.

When the capacitor (29) is discharged into the top winding (13), this voltage therefore remains greater than at least twice the voltage at the threshold of the diodes, or approximately −1.2 volts.

This means that a polarized capacitor can be used as the smoothing capacitor. The presence of the diode (32) antiparallel to the solid-state switch ($i_1$) also protects the latter against any negative voltages. It will be noted that this antiparallel diode can be provided in addition to an existing system, or even be integrated into the solid-state switch itself.

In the form illustrated in FIG. 3, the circuitry also includes a resistor (35) inserted between the second terminal (26) of the motor winding (33), and the first terminal (27) of the motor. This resistor (35) presents a value that can range from a few ohms to a few tens of ohms. In normal operation, this resistor is shunted by the contact of the switch $S_2$, between the terminals $S_{22}$ and $S_{21}$. When both switches S1 and S2 open simultaneously, this resistor is temporarily in parallel with the winding (13, 12) and the rotor (11). This resistor therefore reduces the current circulating in the motor, and reduces the arc on opening of the switches.

It can be seen from the above that the arrangement according to the invention provides for a rapid braking of the motor in cases where it is dictated by the safety requirements, with a system incorporating a chopper arrangement, and this with components similar to those used for the direct AC controls.

INDUSTRIAL APPLICATIONS

The present invention finds application more particularly in the field of food processors featuring the movement of a slicing or cutting tool, but also the fields of blenders, mincers and hand-held choppers, juicers, etc.

The invention claimed is:

1. A domestic electrical appliance, including a universal electric motor, powered by direct current via an electrical circuit linked to a DC electrical voltage source, said circuit including a chopper arrangement, said arrangement including a capacitor connected in parallel with the DC voltage source, and one or more solid-state switches, wherein the circuit also includes two controllable switches, for automatically reconfiguring said circuit:

a first switch of said controllable switches being connected on the one hand to a first terminal of a motor winding of said motor, and on the other hand, alternately to the DC voltage source and to a first terminal of a motor rotor of said motor;

a second switch of said controllable switches being connected on the one hand to a second terminal of said motor winding, and on the other hand, alternately to said first terminal or an other terminal of the motor rotor, and wherein said chopper arrangement is connected between said first switch and said second switch.

2. The appliance as claimed in claim 1, which includes means for mechanically controlling switching over of the controllable switches under effect of an action by a user on a part of the appliance.

3. The appliance as claimed in claim 2, wherein the means for controlling the switching over of the controllable switches provide for a switchover of the two controllable switches staggered in time.

4. The appliance as claimed in claim 1, which includes an electrical resistor linking the second terminal of the motor winding to the first terminal of the motor rotor.

5. The appliance as claimed in claim 1, wherein the controllable switches are electrical relays including one or more contacts.

6. The domestic electrical appliance of claim 1, wherein said chopper arrangement is connected between said first switch and said first terminal.

* * * * *